(No Model.) 2 Sheets—Sheet 1.

E. YOUNG.
GRAIN HARVESTER.

No. 506,189. Patented Oct. 3, 1893.

WITNESSES
W. M. McNair
Jas. C. Dawley

INVENTOR
Edward Young
By H. A. Toulmin
Attorney.

(No Model.) 2 Sheets—Sheet 2.

E. YOUNG.
GRAIN HARVESTER.

No. 506,189. Patented Oct. 3, 1893.

Witnesses,
Jas. C. Dawley
H. M. McNair

Inventor
Edward Young,
By H. A. Toulmin,
his Attorney.

UNITED STATES PATENT OFFICE.

EDWARD YOUNG, OF JEFFERSONVILLE, OHIO, ASSIGNOR OF ONE-HALF TO H. L. CLAUSING, OF SAME PLACE.

GRAIN-HARVESTER.

SPECIFICATION forming part of Letters Patent No. 506,189, dated October 3, 1893.

Application filed April 8, 1893. Serial No. 469,560. (No model.)

*To all whom it may concern:*

Be it known that I, EDWARD YOUNG, a citizen of the United States, residing at Jeffersonville, in the county of Fayette and State of Ohio, have invented certain new and useful Improvements in Grain-Harvesters, of which the following is a specification, reference being had therein to the accompanying drawings.

This invention relates to certain new and useful improvements in grain harvesters, and the object of the invention is to provide mechanism by which the frame and its superincumbent parts, as distinguished from the wheels, may be lowered toward the ground and raised from the ground by the action of the draft of the machine as it moves along the field, such draft or motion being converted into power and applied to the operation of the lowering and lifting mechanism. I also contemplate, as within the purview of my invention, the lowering and lifting of the machine-frame by hand as well as through the draft. It is well known in this art that in order to operate the machine with the minimum draft or resistance to the animals it is requisite that the grain platform shall be kept as nearly level as possible when the cutter bar is to be brought down to near the ground, when it is desired to leave the stubble very short or when the grain is fallen or partially fallen and for that reason it is necessary to bring the cutter bar down close to the ground. It is desirable to do this, yet it is undesirable to merely tip the grain platform forward so that its front edge will drop.

Figure 1:
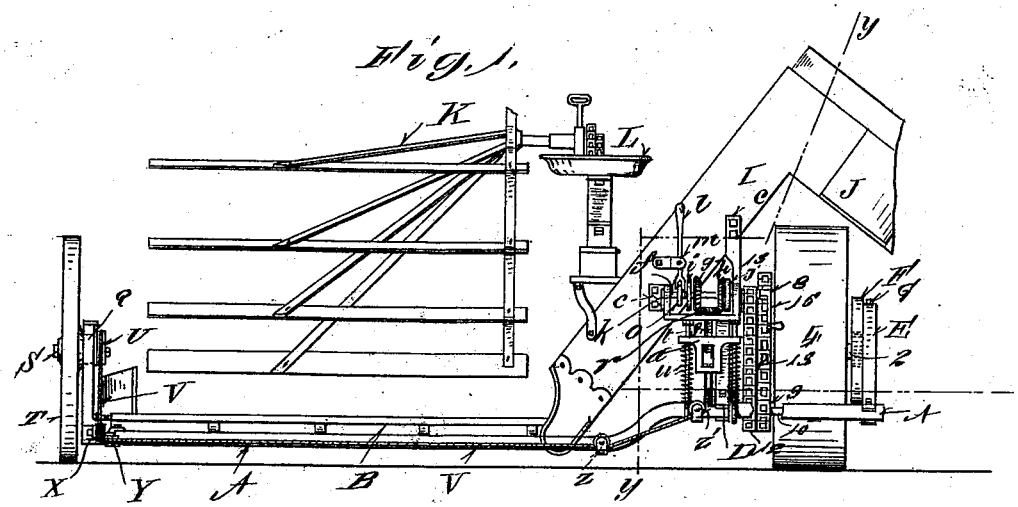
Figure 2:
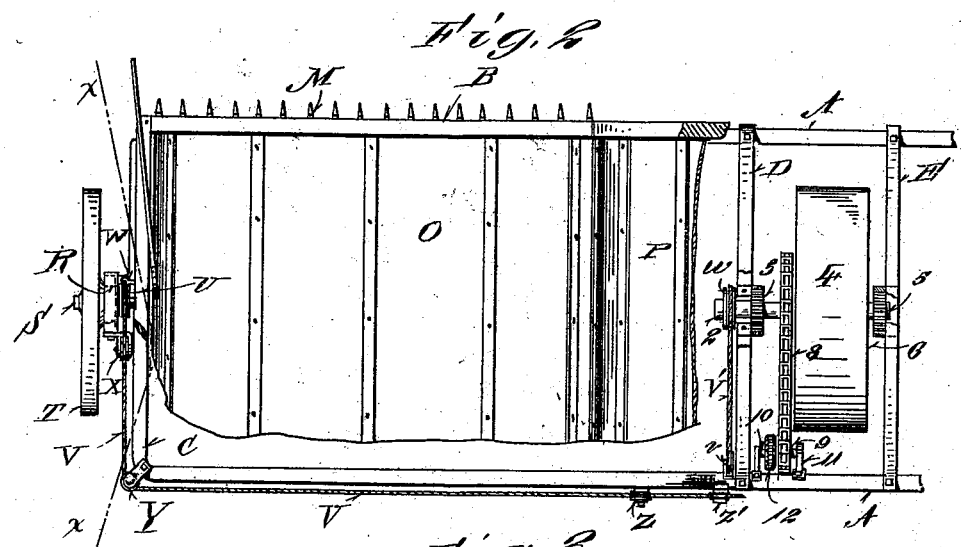
Figure 3:
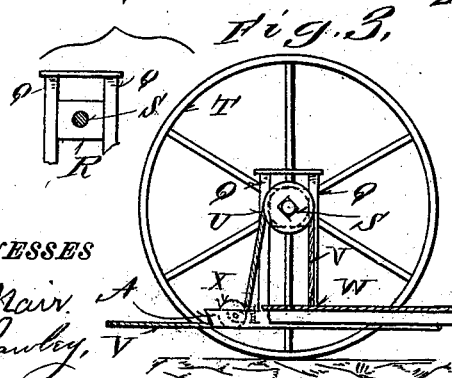
Figure 4:
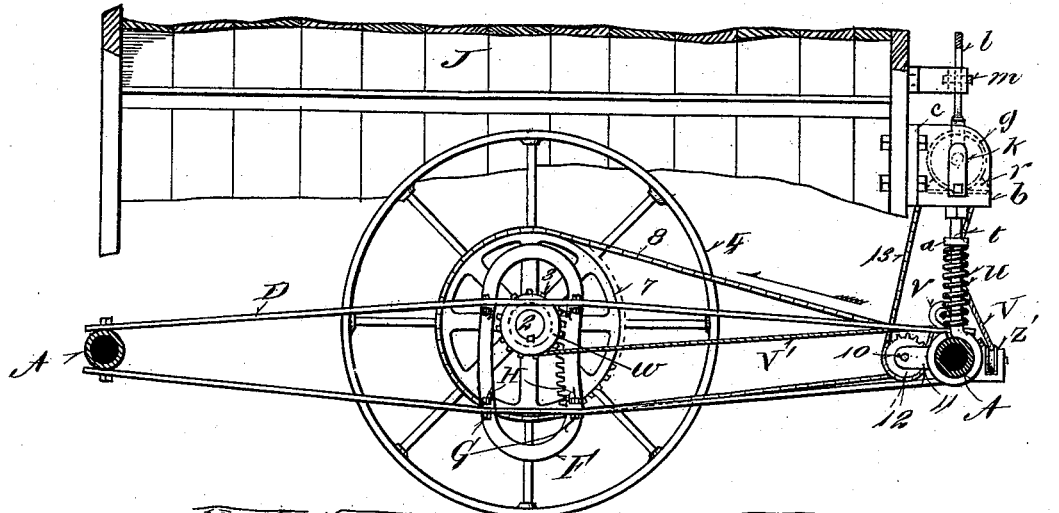
Figure 5:
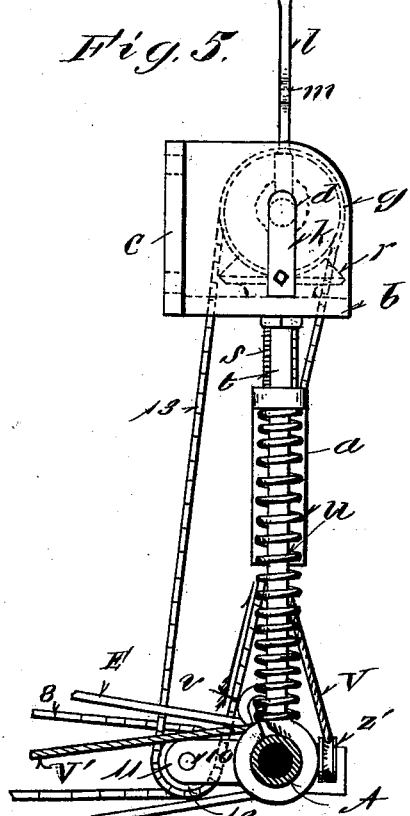
Figure 6:
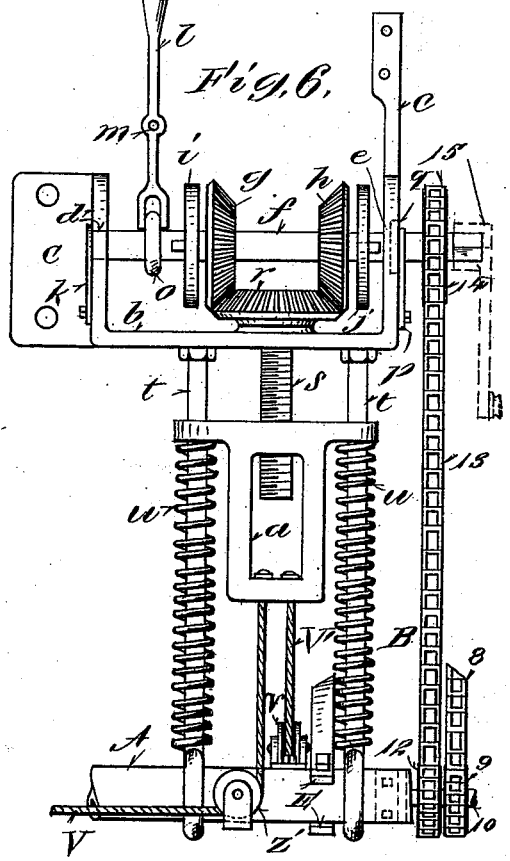

In the accompanying drawings, on which like reference letters and figures indicate corresponding parts: Figure 1, is a rear elevation of one type of grain binder, to which my improvements are shown applied; Fig. 2, a partial plan and sectional view with some of the parts of the machine removed to facilitate illustration; Fig. 3, a sectional view on the line $x\,x$ of Fig. 2, showing the grain wheel in side elevation; Fig. 4, a sectional view taken on the line $y\,y$ of Fig. 1, yet on a larger section; Fig. 5 a detail side view of my lowering and raising mechanism; and Fig. 6 a rear view of it with some of the adjunctive devices.

The letter A designates the front and rear frame pieces of a grain binder, of any approved type, upon a portion of which the grain platform B is constructed. At one end these pieces A are connected by a cross beam C, and near the other end they are connected to girders D and E, each girder being composed of an upper and a lower bar, preferably of metal. These bars are secured to a yoke F by means of bolts G, passing through two lugs H, of the yoke, and through the bars. The bars are farther apart at their connection with the yoke than at their ends, so that they form a stiff structure and act after the manner of truss-rods.

The usual deck I and binder platform J, of a grain binder, are shown in Fig. 1 as also the reel K and a seat L. The cutter bar is indicated at M and the platform apron at O and the elevating-deck apron at P. The platform is constructed with posts Q which receive, between them, a block R which may be slid up and down. In this block is mounted the spindle S of the carrying wheel T. On the spindle is mounted a grooved pulley U, over which passes a rope, cord or chain V, secured to the platform at W, and running under another grooved pulley X connected to the platform in any suitable manner. This rope then passes about another grooved guide pulley Y, and still another Z, and yet another Z', and thence connects with a head $a$.

Referring now to a detailed description of the lowering and raising mechanism it will be seen that a bracket $b$, is secured by plates $c$, to a suitable part of the machine, say to the deck I. This bracket has a bearing $d$, and a bearing $e$, for the shaft $f$. On this shaft are loosely mounted two bevel gear wheels $g$ and $h$. Two friction disks $i$ and $j$ are fixed to the shaft $f$. A spring $k$, secured to the bracket, fits over one end of the shaft $f$, and acts to throw the shaft to the right, as viewed in Fig. 6, when it has been moved longitudinally to the left by the lever $l$, pivoted at $m$, and bifurcated to fit over a collar $o$. A spring $p$, secured at the other end of the bracket, presses against a collar $q$ (shown in dotted lines) fastened to the shaft $f$, so that the spring will act to move the shaft longitudinally to the left, as viewed in Fig. 6 when the shaft has been adjusted to the right by the lever $l$. It will be understood that when the shaft $f$ is adjusted in either of these directions one of the gear wheels $g$ $h$ will be pressed against by one of the friction disks $i$ $j$. The shaft $f$ is constantly rotating when the machine is being drawn along over the field, through mechanism presently to be described. Therefore if the disk $j$ is adjusted against the gear wheel $g$ the latter will be made to rotate with the shaft. Again, if the disk $i$ is adjusted against the gear wheel $h$ the latter will be made to rotate with the shaft $f$. Thus either gear wheel may be rotated. The bracket $c$ further forms a bearing for the shaft of a bevel gear wheel $r$, the lower end of which shaft is screw-threaded, as seen at $s$. Thus when either of the gear wheels $g$ or $h$ is rotated, the gear wheel $r$ is also rotated and its shaft thereby made to run the head $a$, through which it screws, down on the rods or ways $t$ or up on them, as the case may be. These rods are firmly connected with the bracket $c$ and with one of the beams A of the frame. In the present instance this beam is formed of a pipe and these rods are given a turn about the pipe, as clearly seen in Fig. 5. These rods $t$, each carry a spiral spring $u$, which rest at their lower end on the rods where they are turned about the beam, and which at their upper ends bear against the head $a$. We have already seen that the natural tendency of the grain platform or of the machine at that side to drop down is resisted and the machine supported by the rope, cord or chain V. Another similar cord or chain V' connects with the head, passes under a grooved pulley $v$, attached to the frame or beam A and runs thence to a grooved pulley $w$, fixed upon the master wheel shaft 2. Also secured to this shaft is a pinion 3 which meshes with the teeth in one side of the yoke F. The shaft passes on through the master wheel 4, in which it is loosely mounted, and carries at its other end a similar pinion 5 which likewise meshes with the teeth of a similar yoke 6. Thus it will be understood that by operating the mechanism above described so as to run the head $a$ down on the rods or up on them, the cords V V' will be slowly released or likewise drawn upon. When released the weight of the frame settles down and takes up the slack, at the same time rotating the pinion 3 by the descent of the yoke F and thereby winds the rope V' on the pulley $w$. When the ropes V and V' are drawn upon by the head $a$, the rope V, drawing over the grooved pulley U, raises the grain platform or that end of the machine; and the rope V' revolves the pulley $w$ and thence the shaft 2 and the pinions 3 and 5, thereby raising the yokes F and 6 and so elevating that end of the machine.

The springs $u$ are made stiff enough to resist nearly all of the downward strain brought upon the head $a$, and they act as spring supports between the head and the frame, for the tendency of the head is to fly downward, a movement necessary to permit any descent of the frame. Therefore the screw-shaft $s$ is drawn upon but slightly compared with the weight of the frame, and hence the power required to rotate this shaft and make it manipulate the head up and down is reduced to the minimum and is relatively slight. At the same time the screw $s$ acts as a lock to prevent the descent of the head $a$ because of the excess of the strain produced by the weight over the resistance of the springs $u$.

Referring now to the means for rotating the shaft $f$ as the machine moves across the field, it will be seen that the master wheel carries a sprocket wheel 7, which operates a chain 8 passing over a sprocket pulley 9, carried by the shaft 10, mounted in bearings 11, secured to the beam A. This shaft 10 also carries a sprocket pulley 12, whose chain 13 passes over the sprocket pulley 14, fixed upon the shaft $f$. Thus the shaft $f$ is kept in constant rotary motion while the machine is traveling. Its movement is transmitted to the screw $s$, when desired, through the devices already described. When desired to adjust the frame up or down while it is standing, so as to lift it high enough to run under it the moving-truck, used when the machine is being hauled over the roads, a hand crank 15 is applied to the shaft $f$ to rotate it. Thus it will be understood that by my invention I have provided a means of lowering and raising the machine frame by the draft or motion of the machine proper whenever the operator desires, through the master wheel, and operating mechanism receiving motion directly from it, and transmitting the motion to the operating devices which actuate the supporting mechanism.

I am aware that it has been proposed to operate mechanism for raising and lowering the frame of harvesters by receiving motion from a driving shaft projecting from the elevator; which may or may not be the drum shaft of one of the elevator rolls, but such construction I disclaim. I have shown and described one exemplification of mechanism to accomplish this object and carry it into practice, but it is obvious that it may be modified in its details, and changed somewhat in arrangement, without departing from the spirit and substance of my invention. It will further be noticed that I can start and stop my lowering and raising mechanism without jars or sudden jerks because the friction disks gradually impart their motion to the bevel gears when brought up against them, which is done gradually, until the inertia of the parts is overcome.

Besides the function of operating the head the screw-shaft $s$, acts also as a lock by which the head is held fixedly in any adjusted position.

Having thus fully described my invention, what I claim as new, and desire to secure by Letters Patent, is—

1. In a harvesting machine, the combination with the master and grain wheels and frame of the machine, of adjustable supporting devices, a head attached to the supporting devices, a spring support between said head and the frame of the machine operating mechanism for the said head, motion transmitting mechanism between the master wheel and the said operating mechanism.

2. In a harvesting machine, the combination with the master and grain wheels and the frame of the machine, of supporting ropes, cords or chains, one attached to the grain platform and passing over a pulley supported by the grain wheel shaft and thence about guiding pulleys, and the other attached to the master wheel shaft, and devices between said shaft and the frame to adjustably support the latter, of rods or guides, a slidable head on them, springs between the frame and said head to partially sustain the head, said ropes, cords or chains being attached to said head, a screw actuating and partially sustaining said head, gear mechanism to operate said screw, first in one direction and then in the other, and sprocket wheels and sprocket chains between the master wheel and said gear mechanism to give motion to the latter, and a device to throw the gear mechanism in and out of operation.

3. In a harvesting machine, the combination with the grain and master wheels and the frame of the machine adjustably supported by the master wheel and slidingly connected to the grain wheel, a rope connected to the master wheel shaft, and intermediate devices by which it actuates the supporting devices, another rope connected to the grain platform and passing over a pulley sustained by the grain wheel, guiding pulleys for said ropes, rods supported by the frame, a head on the rods, springs between the head and frame, a bracket supported by the frame, the screw-shaft mounted in the bracket and screwing into the head, an operating shaft carried by the bracket and having two gear wheels meshing with a gear wheel on the screw-shaft, two frictional disks on the operating shaft, a device to shift them respectively against the respective gears on the said shaft, a sprocket pinion on said shaft, an auxiliary shaft with two sprocket pinions, a sprocket gear on the master wheel, and sprocket chains between said sprocket gear and one pinion on the auxiliary shaft, and between the other pinion on that shaft and a pinion on the operating shaft.

4. In a harvesting machine, a lowering and raising mechanism consisting of a bracket, rods secured thereto and adapted to connect with the frame, a head on the rods, springs under the head and adapted to rest on the frame, a screw shaft screwed into the head and carried by the bracket and having a bevel gear, an operating shaft carried by the bracket and having two fixed friction disks and two loose bevel gears meshing with said bevel gear, a lever to shift the shaft and bring one disk against one bevel gear at one time and the other disk against the other bevel gear at another time, and springs to return the shaft to normal position.

5. In a harvesting machine, a lowering and raising mechanism consisting essentially of rods or ways, a slidable head on them, a spring support between the head and frame, a screw shaft to operate the head, and an operating shaft and intermediate devices to operate the screw shaft intermittently.

6. In a harvesting machine, a lowering and raising mechanism consisting of rods or ways, a bracket, a head on the rods or ways, a screw-shaft to actuate it mounted in the bracket and having a bevel gear, an operating shaft mounted in the bracket and having two loose bevel gears meshing with said bevel gear and two fixed friction disks, a lever to move the shaft longitudinally and engage one disk with one gear at one time, and the other disk with the other gear at another time, and springs to return the shaft to normal position.

In testimony whereof I affix my signature in presence of two witnesses.

EDWARD YOUNG.

Witnesses:
C. E. DODDS,
C. S. SPANGLER.